US011127286B2

(12) United States Patent
Shionozaki et al.

(10) Patent No.: US 11,127,286 B2
(45) Date of Patent: Sep. 21, 2021

(54) INFORMATION PROCESSING DEVICE AND METHOD, AND RECORDING MEDIUM

(71) Applicant: Sony Corporation, Tokyo (JP)

(72) Inventors: Atsushi Shionozaki, Tokyo (JP); Masamichi Asukai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 266 days.

(21) Appl. No.: 16/317,565

(22) PCT Filed: Aug. 14, 2017

(86) PCT No.: PCT/JP2017/029254
§ 371 (c)(1),
(2) Date: Jan. 14, 2019

(87) PCT Pub. No.: WO2018/037955
PCT Pub. Date: Mar. 1, 2018

(65) Prior Publication Data
US 2019/0287390 A1 Sep. 19, 2019

(30) Foreign Application Priority Data

Aug. 26, 2016 (JP) .............................. JP2016-165710

(51) Int. Cl.
*G08G 1/01* (2006.01)
*B64C 39/02* (2006.01)
(Continued)

(52) U.S. Cl.
CPC ........... *G08G 1/0125* (2013.01); *B64C 39/02* (2013.01); *B64C 39/024* (2013.01);
(Continued)

(58) Field of Classification Search
CPC ............................. G08G 1/0125; B64C 39/02
See application file for complete search history.

(56) References Cited

U.S. PATENT DOCUMENTS 6,652,351 B1 * 11/2003 Rehkemper ............ A63H 13/02
446/312
6,798,357 B1 * 9/2004 Khan ................... G08G 1/0104
340/989

(Continued)

FOREIGN PATENT DOCUMENTS

CN 101446636 A 6/2009
CN 104054077 A 9/2014
(Continued)

OTHER PUBLICATIONS

International Search Report dated Oct. 10, 2017 for PCT/JP2017/029254 filed on Aug. 14, 2017, 6 pages including English translation.

*Primary Examiner* — Jess Whittington
(74) *Attorney, Agent, or Firm* — Xsensus LLP

(57) ABSTRACT

A mobile unit control unit causes a communication unit to transmit user setting information supplied from an input unit and control data for controlling a mobile unit. A display control unit generates display data corresponding to the human flow data in a human flow data DB, and outputs the generated display data to a display unit. The communication unit transmits control data, measurement area information, and landing area information to the mobile unit, and receives human flow data from the mobile unit and supplies the human flow data to a control unit. The input unit sets setting information relating to human flow data measurement, in response to a user operation. The display unit performs display corresponding to the display data generated by the display control unit. The present disclosure can be applied to a human flow measurement system including a mobile unit and a terminal, for example.

13 Claims, 15 Drawing Sheets

(51) Int. Cl.
*G05D 1/00* (2006.01)
*G05D 1/08* (2006.01)

(52) U.S. Cl.
CPC ......... *G05D 1/0016* (2013.01); *G05D 1/0038* (2013.01); *G05D 1/0808* (2013.01); *G08G 1/01* (2013.01); *G08G 1/0112* (2013.01); *G08G 1/0141* (2013.01); *B64C 2201/12* (2013.01); *B64C 2201/146* (2013.01)

(56) References Cited

U.S. PATENT DOCUMENTS

| | | | | |
|---|---|---|---|---|
| 9,104,201 | B1* | 8/2015 | Pillai | G08G 5/0082 |
| 10,140,874 | B2* | 11/2018 | Yang | B64C 39/024 |
| 10,351,240 | B1* | 7/2019 | Sills | H04B 7/18506 |
| 2007/0288132 | A1 | 12/2007 | Lam | |
| 2016/0028471 | A1* | 1/2016 | Boss | H04B 7/2606 |
| | | | | 455/406 |
| 2016/0207626 | A1* | 7/2016 | Bailey | B64C 39/022 |
| 2016/0210675 | A1* | 7/2016 | Smart | G06Q 10/02 |
| 2016/0307447 | A1* | 10/2016 | Johnson | B60L 58/12 |
| 2016/0328979 | A1* | 11/2016 | Postrel | H04W 4/46 |
| 2017/0061826 | A1* | 3/2017 | Jain | G09B 19/167 |
| 2017/0083748 | A1* | 3/2017 | Zhou | G06K 9/4604 |
| 2017/0123418 | A1* | 5/2017 | Erickson | G08G 5/0043 |
| 2017/0136842 | A1* | 5/2017 | Anderson | B60G 17/016 |
| 2017/0311127 | A1* | 10/2017 | Murphy | G01S 5/0252 |
| 2017/0334559 | A1* | 11/2017 | Bouffard | G08G 5/0082 |
| 2017/0355453 | A1* | 12/2017 | Kim | B64C 39/024 |
| 2019/0361694 | A1* | 11/2019 | Gordon | G06F 1/169 |

FOREIGN PATENT DOCUMENTS

| | | |
|---|---|---|
| CN | 104835322 A | 8/2015 |
| CN | 105095451 A | 11/2015 |
| CN | 105760831 A | 7/2016 |
| CN | 105760853 A | 7/2016 |
| JP | 62-122678 A | 6/1987 |
| JP | 2002288385 A | 10/2002 |
| JP | 2004-101616 A | 4/2004 |
| JP | 2015-188150 A | 10/2015 |

\* cited by examiner

| (n00, t00) | (n01, t01) | (n02, t02) | (n03, t03) | ... |
| (n10, t10) | (n11, t11) | (n12, t12) | (n13, t13) | ... |
| (n20, t20) | (n21, t21) | (n22, t22) | (n23, t23) | ... |
| (n30, t30) | (n31, t31) | (n32, t32) | (n33, t33) | ... |
| ... | ... | ... | ... | ... |

INFORMATION PROCESSING DEVICE AND METHOD, AND RECORDING MEDIUM

CROSS-REFERENCE TO RELATED APPLICATIONS

This application is a National Stage Application based on PCT/JP2017/029254, filed on 14 Aug. 2017, and claims priority to Japanese Patent Application No. 2016-165710, filed on 26 Aug. 2016, the entire contents of which being incorporated herein by reference.

TECHNICAL FIELD

The present disclosure relates to an information processing device and a method, and a recording medium. More particularly, the present disclosure relates to an information processing device and a method that enable easy acquisition of human flow data of a wide area, and a recording medium.

BACKGROUND ART

An unmanned aerial vehicle (drone) is designed to be capable of acquiring data of a remote place. In recent years, sensing with an unmanned aerial vehicle using various kinds of sensors has been suggested (Patent Document 1).

Meanwhile, many multifunctional mobile telephones (such as smartphones) have a Wi-Fi function, and occasionally emit radio waves to search for access points. As the radio waves are sensed, human flow data indicating human flow is acquired and is used for services.

CITATION LIST

Patent Document

Patent Document 1: Japanese Patent Application Laid-Open No. 2015-188150

SUMMARY OF THE INVENTION

Problems to be Solved by the Invention

However, each terminal only has a fixed area of radio wave sensing. Therefore, to acquire data of a wide area, a large number of terminals need to be installed. Furthermore, it is difficult to acquire data of remote places.

In view of this, there is a demand for acquisition of human flow data with an unmanned aerial vehicle capable of acquiring data of remote places.

The present disclosure is made in view of such circumstances, and is to enable easy acquisition of human flow data of a wide area.

Solutions to Problems

An information processing device according to an aspect of the present technology includes: a setting unit that sets a measurement area; a mobile unit control unit that controls a mobile unit to move to the measurement area set by the setting unit and measure human flow data indicating human flow; a reception unit that receives the human flow data measured by the mobile unit; and a display control unit that controls display corresponding to the human flow data received by the reception unit.

In a case where the mobile unit is not in the measurement area, the mobile unit control unit may control the mobile unit to move from a present location to the measurement area and measure the human flow data.

The mobile unit control unit may control the mobile unit to measure the human flow data in the vicinity while circling from a present location in the measurement area.

The mobile unit control unit may control the mobile unit to turn toward the position with the largest human flow and measure the human flow data in the vicinity in the measurement area.

In a case where a plurality of mobile units perform measurement, the mobile unit control unit may control each of the plurality of mobile units to measure the human flow data in the vicinity by moving while correcting a motion vector.

The display control unit may control display in which the size of human flow corresponding to the human flow data is expressed in a heat map.

When controlling the display in which the size of human flow corresponding to the human flow data is expressed in a heat map, the display control unit may control the display, to make previous data portions vary with time.

The setting unit may set a landing area.

The mobile unit control unit may control the mobile unit to move to the landing area set by the setting unit at an end of measurement or at a time of a fuel shortage.

The setting unit may further set the number of people existing in the vicinity at a time of landing, and the mobile unit control unit may control the mobile unit to measure the human flow data in the landing area. In a case where the measured human flow data is larger than the number of people set by the setting unit, the mobile unit control unit controls the mobile unit to measure the human flow data while circling. In a case where the measured human flow data is smaller than the number of people set by the setting unit, the mobile unit control unit controls the mobile unit to land.

The information processing device may further include a transmission unit that transmits landing instruction data. In a case where the landing instruction data transmitted by the transmission unit is received, the mobile unit control unit controls the mobile unit to land in the landing area in accordance with the landing instruction data.

An information processing method according to an aspect of the present technology is an information processing device implemented by an information processing device, and includes: setting a measurement area; controlling a mobile unit to move to the set measurement area and measure human flow data indicating human flow; receiving the human flow data measured by the mobile unit; and controlling display corresponding to the received human flow data.

A program recorded in a recording medium according to an aspect of the present technology is a program for causing a computer to function as: a setting unit that sets a measurement area; a mobile unit control unit that controls a mobile unit to move to the measurement area set by the setting unit and measure human flow data indicating human flow; a reception unit that receives the human flow data measured by the mobile unit; and a display control unit that controls display corresponding to the human flow data received by the reception unit.

In one aspect of the present technology, a measurement area is set, and a mobile unit is controlled to move to the set measurement area and measure human flow data indicating human flow. The human flow data measured by the mobile unit is then received, and the display corresponding to the received human flow data is controlled.

Effects of the Invention

According to the present technology, human flow data of a wide area can be easily acquired.

It should be noted that the advantageous effects described in this specification are merely examples, and the advantageous effects of the present technology are not limited to them and may include some additional effects.

MODE FOR CARRYING OUT THE INVENTION

The following is a description of a mode for carrying out the present disclosure (this mode will be hereinafter referred to as "embodiment").

<Example Configuration of System>

Figure 1:
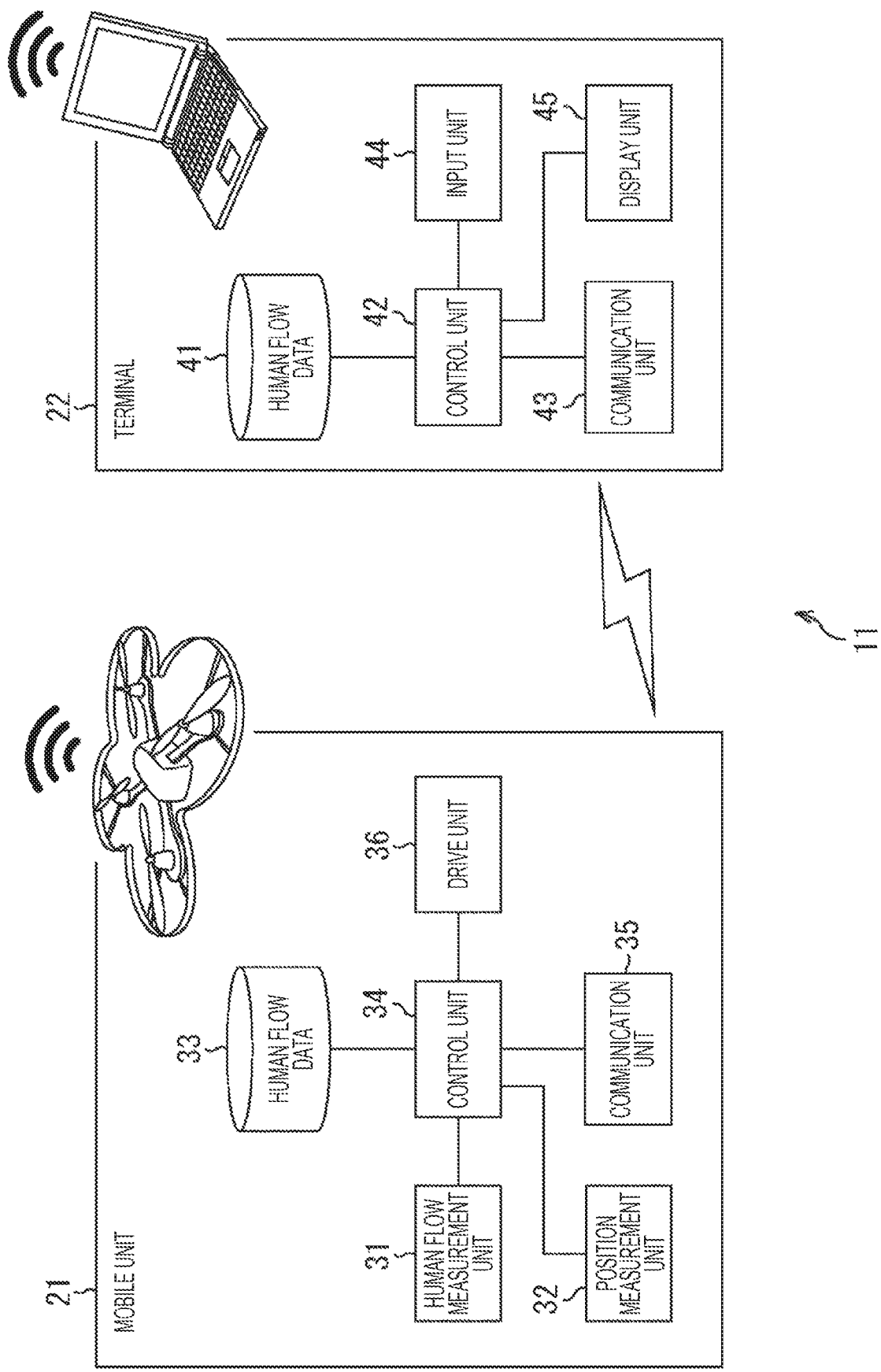
FIG. 1 is a block diagram showing an example configuration of a human flow measurement system according to the present technology.

FIG. 1 is a diagram showing an example configuration of a human flow measurement system according to the present technology. Many multifunctional mobile telephones (such as smartphones) have a Wi-Fi function, and occasionally emit radio waves to search for access points. The human flow measurement system shown in the example in FIG. 1 is a system that acquires human flow data indicating the flow of people carrying multifunctional mobile telephones by sensing the radio waves, for example, and performs display corresponding to the acquired human flow data.

In the example shown in FIG. 1, a human flow measurement system 11 includes a mobile unit 21 that moves to a measurement area and measures human flow data, and a terminal 22 that inputs measurement conditions for the mobile unit 21 and controls the display corresponding to human flow data. Many multifunctional mobile telephones (such as smartphones and the like) have a Wi-Fi function, and occasionally emit radio waves to search for access points.

The mobile unit 21 is typically a drone, but may be any other structure as long as it is movable. The mobile unit 21 is preferably capable of flying as well, but is not necessarily capable of flying. The mobile unit 21 includes a human flow measurement unit 31, a position measurement unit 32, a human flow data database (DB) 33, a control unit 34, a communication unit 35, and a drive unit 36.

The human flow measurement unit 31 measures human flow data by measuring the radio waves being emitted by multifunctional mobile telephones to search for access points. The measured human flow data is supplied to the control unit 34.

The position measurement unit 32 is formed with a positional information measurement system such as a global positioning system (GPS) or the like. The position measurement unit 32 detects the position of the mobile unit 21, and supplies positional information indicating the detection result to the control unit 34. The human flow data DB 33 registers the human flow data from the human flow measurement unit 31 via the control unit 34.

Under the control of the terminal 22, the control unit 34 controls the respective components of the mobile unit 21. That is, in accordance with measurement conditions sent via the communication unit 35, the control unit 34 causes the human flow measurement unit 31 to measure human flow data, causes the position measurement unit 32 to detect the position of the mobile unit 21, causes the human flow data DB 33 to register the human flow data measured by the human flow measurement unit 31, and causes the communication unit 35 to transmit the human flow data to the terminal 22. Further, in accordance with the measurement conditions (such as measurement area information and landing area information) sent via the communication unit 35 and positional information from the position measurement unit 32, the control unit 34 drives the drive unit 36 to move the mobile unit 21.

The communication unit 35 transmits the human flow data to the terminal 22, and receives the measurement conditions from the terminal 22 and supplies the measurement conditions to the control unit 34. Under the control of the control unit 34, the drive unit 36 drives the respective components of the mobile unit 21.

The terminal 22 is formed with a personal computer, a tablet terminal, a mobile telephone, or the like, for example, and includes a human flow data database (DB) 41, a control unit 42, a communication unit 43, an input unit 44, and a display unit 45.

The human flow data DB 41 registers the human flow data measured by the mobile unit 21 via the control unit 42.

Figure 2:
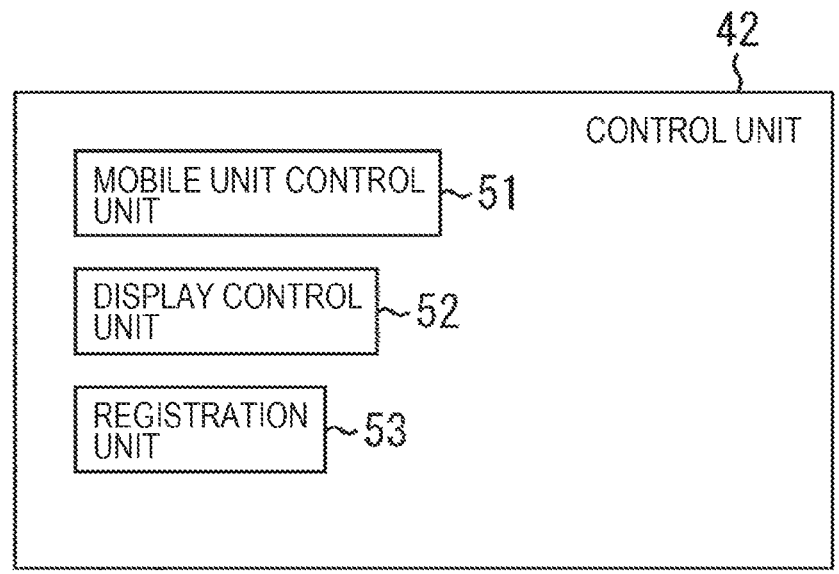
FIG. 2 is a block diagram showing an example functional configuration of the control unit of a mobile unit.

As shown in FIG. 2, the display unit 45 includes a mobile unit control unit 51, a display control unit 52, and a registration unit 53. The mobile unit control unit 51 causes the communication unit 43 to transmit measurement conditions set by the user and sent from the input unit 44. Furthermore, when landing is to be performed in a manual mode, the mobile unit control unit 51 causes the communication unit 43 to transmit a control signal for landing. The display control unit 52 generates display data corresponding to the human flow data in the human flow data DB 41, and outputs the generated display data to the display unit 45. The registration unit 53 registers the human flow data acquired via the communication unit 43 in the human flow data DB 41.

The communication unit 43 transmits the measurement conditions to the mobile unit 21, and receives the human flow data from the mobile unit 21 and supplies the human flow data to the control unit 42. The input unit (setting unit) 44 sets the measurement conditions relating to human flow data measurement, in response to a user operation. The display unit 45 performs display corresponding to the display data generated by the display control unit 52.

Figure 3:
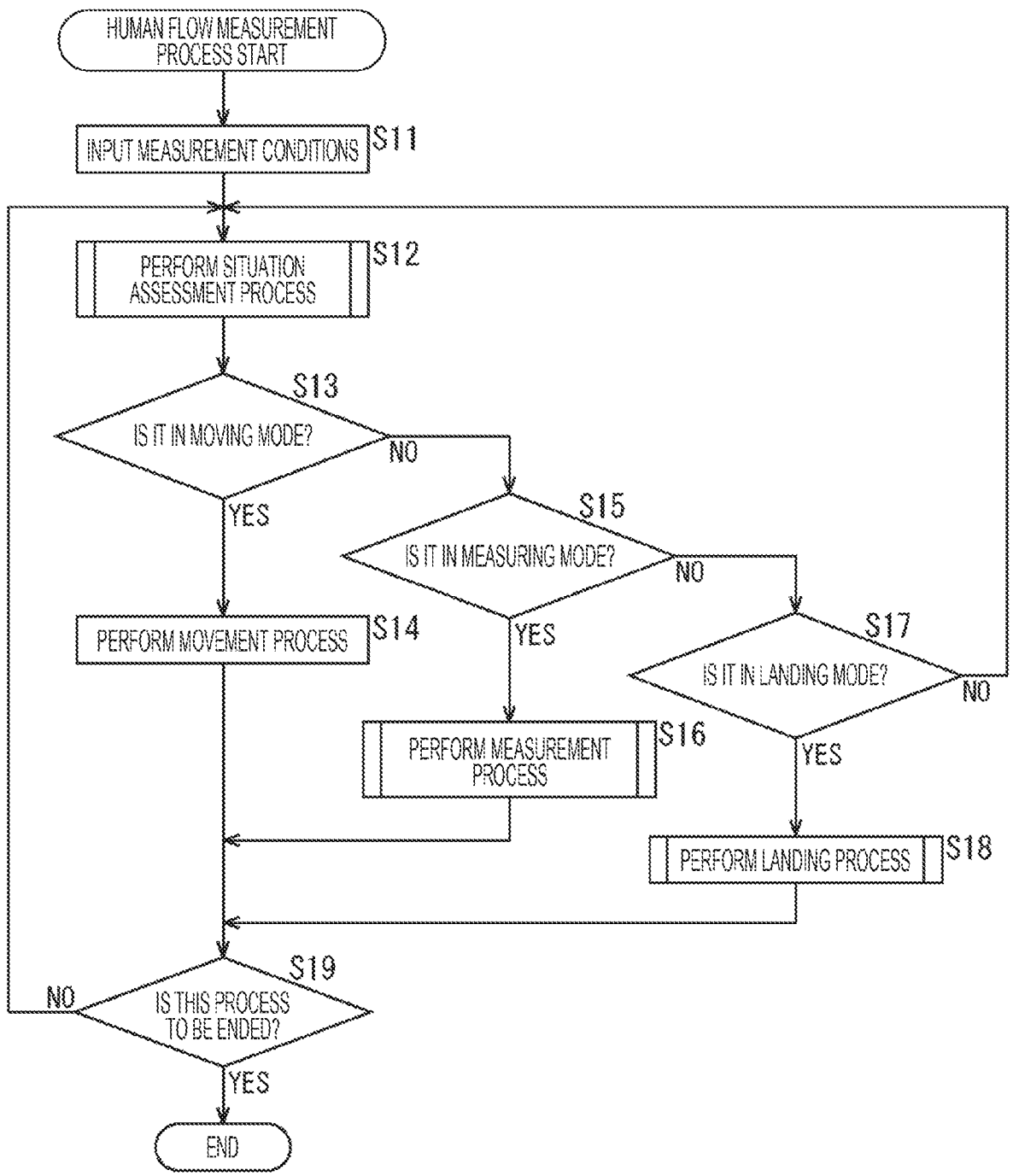
FIG. 3 is a flowchart for explaining a human flow measurement process to be performed by the human flow measurement system.

Referring now to the flowchart shown in FIG. 3, a human flow measurement process to be performed by the human flow measurement system 11 is described.

Figure 4:
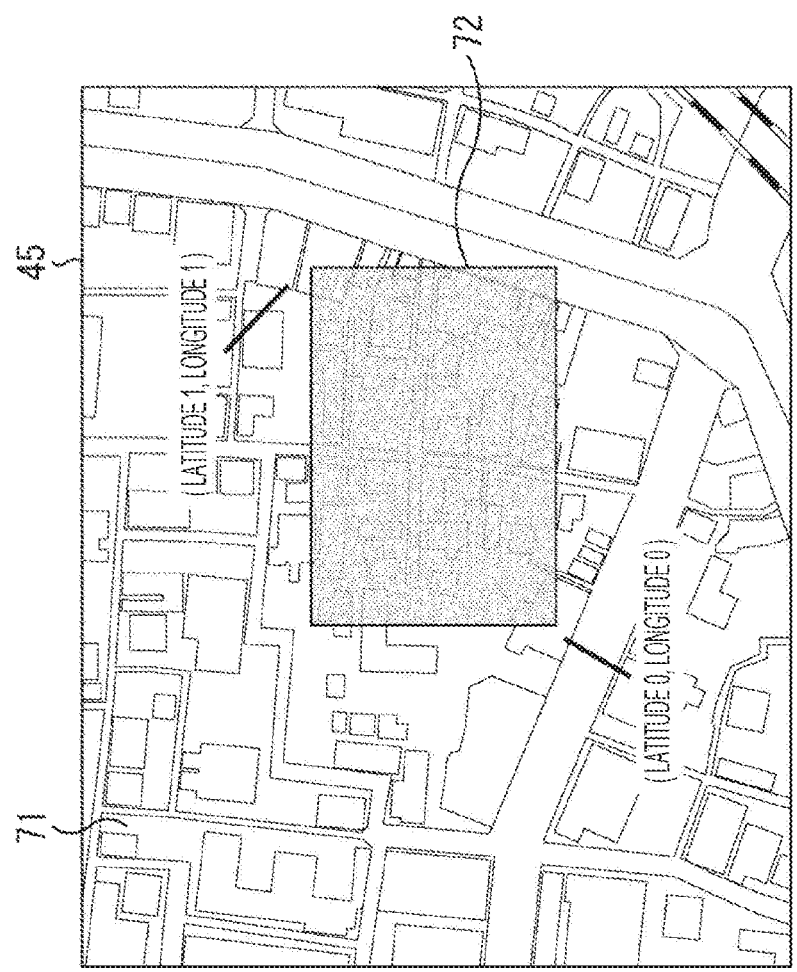
FIG. 4 is a diagram for explaining setting of measurement conditions.

The user operates the input unit 44, to input measurement conditions. In response to this, the input unit 44 sets the measurement conditions in step S11, and supplies the measurement conditions to the mobile unit control unit 51. For example, as shown in FIG. 4, a map 71 is displayed on the display unit 45, and a measurement area 72 defined by a lower left point (latitude 0, longitude 0) and an upper right point (latitude 1, longitude 1) via the input unit 44. Furthermore, the landing area for times when there is a fuel shortage or measurement is completed is set as well as the measurement area 72. When measurement is performed by a plurality of mobile units 21 cooperating with one another, the IDs of the other mobile units 21 and the like are also input. The mobile unit control unit 51 transmits the set measurement conditions to the mobile unit 21 via the communication unit 43. The control unit 34 of the mobile unit 21 acquires the measurement conditions (the measurement area, the landing area, the IDs of the other mobile units 21, and the like) via the communication unit 35.

Note that the process thereafter is a process to be performed by the control unit 34 of the mobile unit 21 in accordance with the measurement conditions sent from the mobile unit control unit 51, or under the control of the mobile unit control unit 51.

In step S12, the control unit 34 of the mobile unit 21 performs a situation assessment process. This situation assessment process will be described later in detail with reference to FIG. 6. Through this process, which mode the mobile unit 21 is currently in is determined: a moving mode, a measuring mode, or a landing mode.

In step S13, the control unit 34 determines whether or not the mobile unit 21 is currently in the moving mode. If the mobile unit 21 is determined to be in the moving mode in step S13, the process moves on to step S14.

Figure 5:
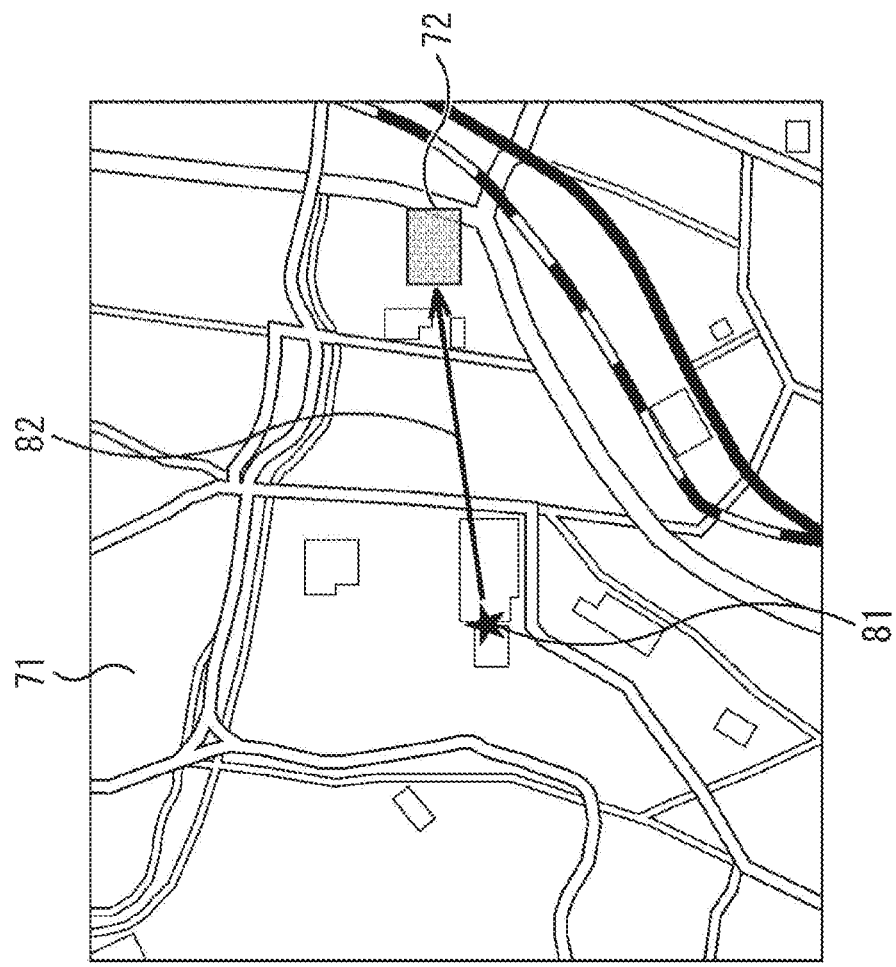
FIG. 5 is a diagram for explaining a movement process.

In step S14, the control unit 34 performs a movement process. For example, in the example shown in FIG. 5, the control unit 34 causes the position measurement unit 32 to acquire a present location 81 that is connected to the measurement area 72 with an arrow 82 indicating a moving direction on the map 71 shown by the display unit 45, and controls the drive unit 36 to move the mobile unit 21 from the acquired present location 81 in the moving direction indicated by the arrow 82 into the measurement area 72 set by the terminal 22. After that, the process moves on to step S19.

If the mobile unit 21 is determined not to be in the moving mode in step S13, on the other hand, the process moves on to step S15. In step S15, the control unit 34 determines whether or not the mobile unit 21 is currently in the measuring mode. If the mobile unit 21 is determined to be in the measuring mode in step S15, the process moves on to step S16.

In step S16, the control unit 34 performs a measurement process. This measurement process will be described later in detail with reference to FIG. 7. Through this process, the human flow in the measurement area is measured. After that, the process moves on to step S19.

If the mobile unit 21 is determined not to be in the measuring mode in step S15, the process moves on to step S17. In step S17, the control unit 34 determines whether or not the mobile unit 21 is currently in the landing mode. If the mobile unit 21 is determined not to be in the landing mode in step S17, the process returns to step S13, and the process thereafter is repeated. If the mobile unit 21 is determined to be in the landing mode in step S17, the process moves on to step S18.

In step S18, the control unit 34 performs a landing process. This landing process will be described later in detail with reference to FIG. 15. Through this landing process, the mobile unit 21 lands automatically or manually. After that, the process moves on to step S19.

In step S19, the control unit 34 determines whether or not to end the human flow measurement process. If it is determined that the human flow measurement process is not to be ended, the process returns to step S12, and the process thereafter is repeated. If it is determined in step S19 that the process is to be ended, the human flow measurement process shown in FIG. 3 is ended.

Figure 6:
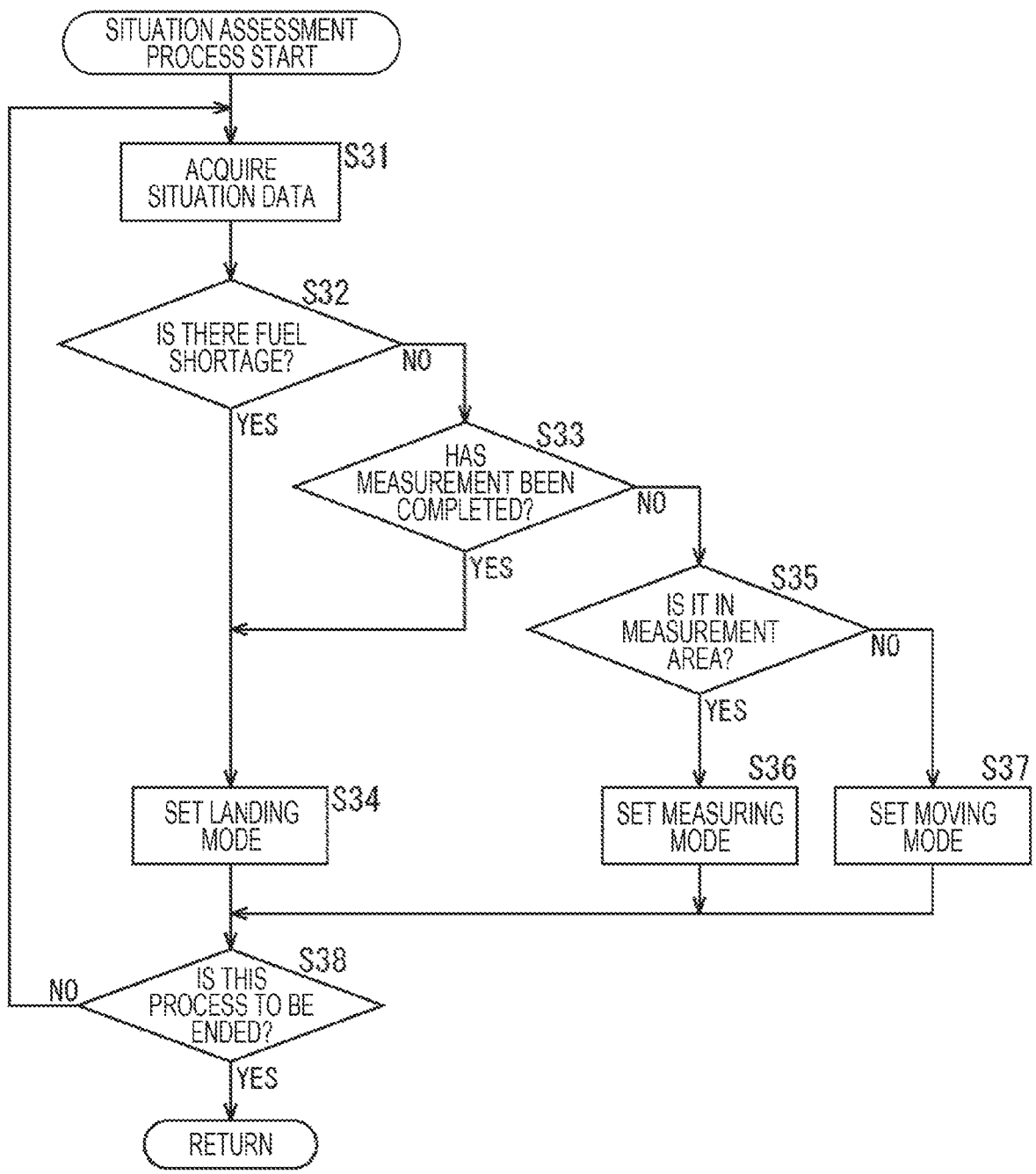
FIG. 6 is a flowchart for explaining a situation assessment process.

Referring now to the flowchart in FIG. 6, the situation assessment process in step S12 in FIG. 3 is described.

In step S31, the control unit 34 acquires situation data that is the amount of fuel, the amount of measurement, the present location, and the like. In step S32, the control unit 34 determines whether or not there is a fuel shortage. If it is determined that there is a fuel shortage in step S32, the process moves on to step S33. In step S33, the control unit 34 determines whether or not the measurement has been completed.

If it is determined in step S32 that there is a fuel shortage, or if it is determined in step S33 that the measurement has been completed, the process moves on to step S34. In step S34, the control unit 34 puts the mobile unit 21 into the landing mode. After that, the process moves on to step S38.

If it is determined in step S33 that the measurement has not been completed, on the other hand, the process moves on to step S35. In step S35, the control unit 34 determines whether or not the mobile unit 21 is in the measurement area. If the mobile unit 21 is determined to be in the measurement area in step S35, the process moves on to step S36. In step S36, the control unit 34 puts the mobile unit 21 into the measuring mode. After that, the process moves on to step S38.

If the mobile unit 21 is determined not to be in the measurement area in step S35, the process moves on to step S37. In step S37, the control unit 34 puts the mobile unit 21 into the moving mode. After that, the process moves on to step S38.

In step S38, the control unit 34 determines whether or not to end the situation assessment process. If it is determined in step S38 that the situation assessment process is not to be ended, the process returns to step S31, and the process thereafter is repeated. If it is determined in step S38 that the situation assessment process is to be ended, the process is ended.

Figure 7:
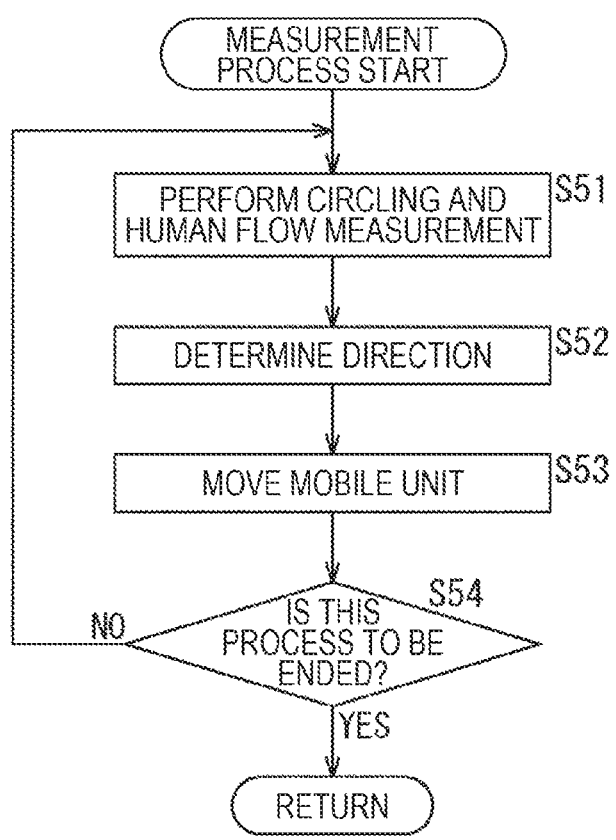
FIG. 7 is a flowchart for explaining a measurement process.

Referring now to the flowchart in FIG. 7, the measurement process in step S16 in FIG. 3 is described. Note that this measurement process may be ended after one measuring operation, or may be repeated until a predetermined time comes or the fuel runs out.

In step S51, the control unit 34 controls the drive unit 36 and the human flow measurement unit 31 to carry out human flow measurement in the vicinity while circling from the present location. In the example shown in FIG. 8, a map of a measurement area 91 is shown. For example, the measurement area 91 is divided to have a lattice-like form of such a size that can be measured in one operation by the mobile unit 21. Of the lattice, a lattice cell group 92 that has already been measured is shaded as a heat map according to the human flow. For example, the shades of the lattice cells represent the amounts of human flow. In this example, the control unit 34 measures the human flow in each lattice cell while causing the mobile unit 21 to circle in the clockwise direction as indicated by arrows 94 extending from the present location 93.

Figure 9:
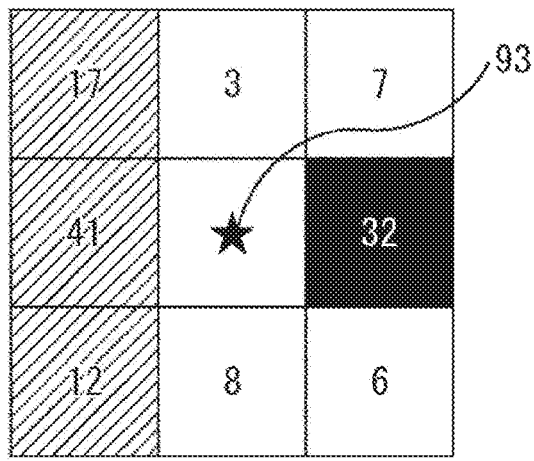
FIG. 9 is a diagram showing a matrix for determining a direction.

In step S52, the control unit 34 determines a direction. FIG. 9 shows an example of the matrix for determining a direction. The numerical numbers represent the values already measured by the circling and the measurement performed in step S51. As shown in FIG. 9, at the present location 93, the control unit 34 determines the direction toward the darkest cell where there was the largest human flow, except for the cells (slightly shaded cells) measured immediately before that. In this manner, it is possible to efficiently perform measurement only in the places where there are many people.

In step S53, the control unit 34 controls the drive unit 36 to move the mobile unit 21 in the direction determined in step S52.

In step S54, the control unit 34 determines whether or not to end the measurement process. If it is determined in step S54 that the measurement process is not to be ended, the process returns to step S51, and the process thereafter is repeated. If it is determined in step S54 that the measurement process is to be ended, the measurement process is ended.

Figure 8:
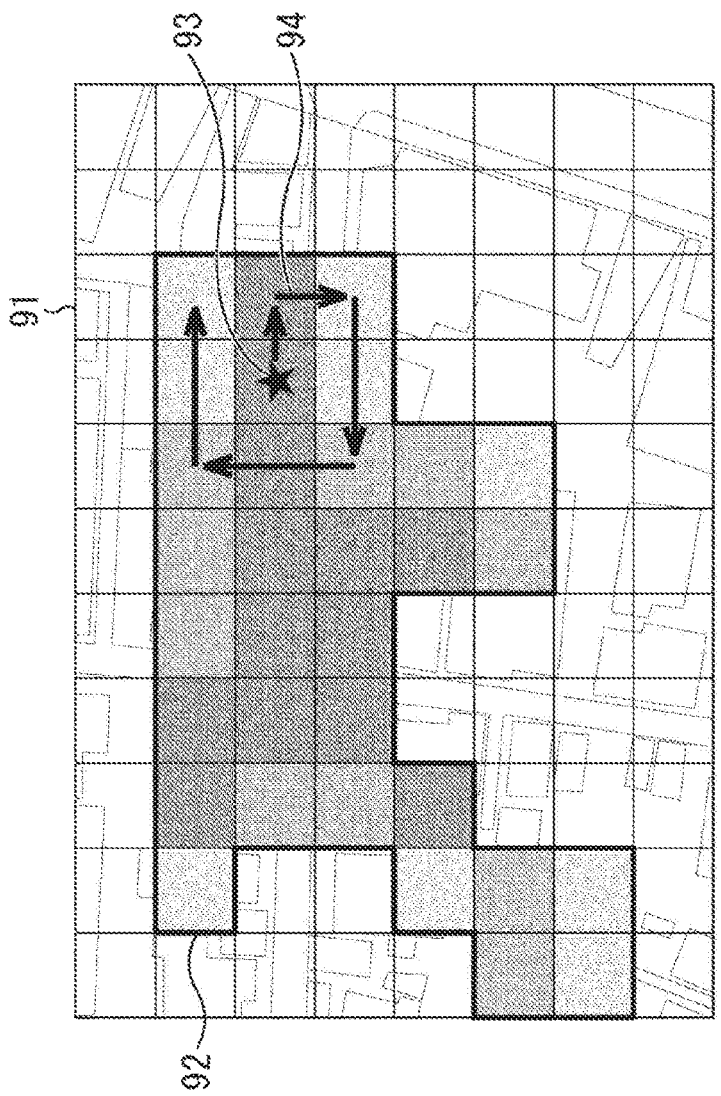
FIG. 8 is a diagram showing an example of circling from a present location in a measurement area.

Note that FIG. 8 shows an example of circling, and FIG. 9 shows an example of a method of determining a direction. In either of the drawings, some other method may be used.

Figure 10:
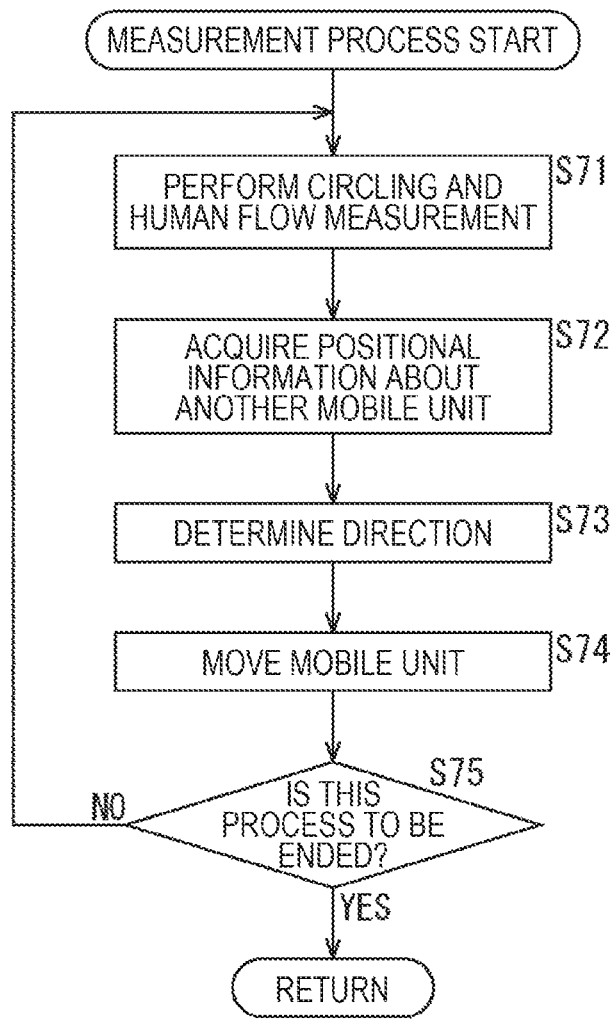
FIG. 10 is a flowchart for explaining a measurement process in a case where there are a plurality of mobile units.

Referring now to the flowchart in FIG. 10, another example of the measurement process in step S16 in FIG. 3 is described. Specifically, the example shown in FIG. 10 is an example case where there are a plurality of mobile units 21-1 and 21-2. Furthermore, in a map of the measurement area 91 shown in FIG. 11, a lattice cell group 92 already measured by the mobile unit 21-1 and a lattice cell group 102 already measured by the mobile unit 21-2 are shaded as a heat map according to the human flow. For example, the shades of the lattice cells represent the amounts of human flow.

In step S71, the control unit 34 of the mobile unit 21-1 controls the drive unit 36 and the human flow measurement unit 31 to perform human flow measurement in the vicinity while circling from the present location, for example, as described above with respect to step S51 in FIG. 7.

In step S72, the control unit 34 acquires the positional information about the other mobile unit 21-2 via the communication unit 35.

Figures 11, 12:
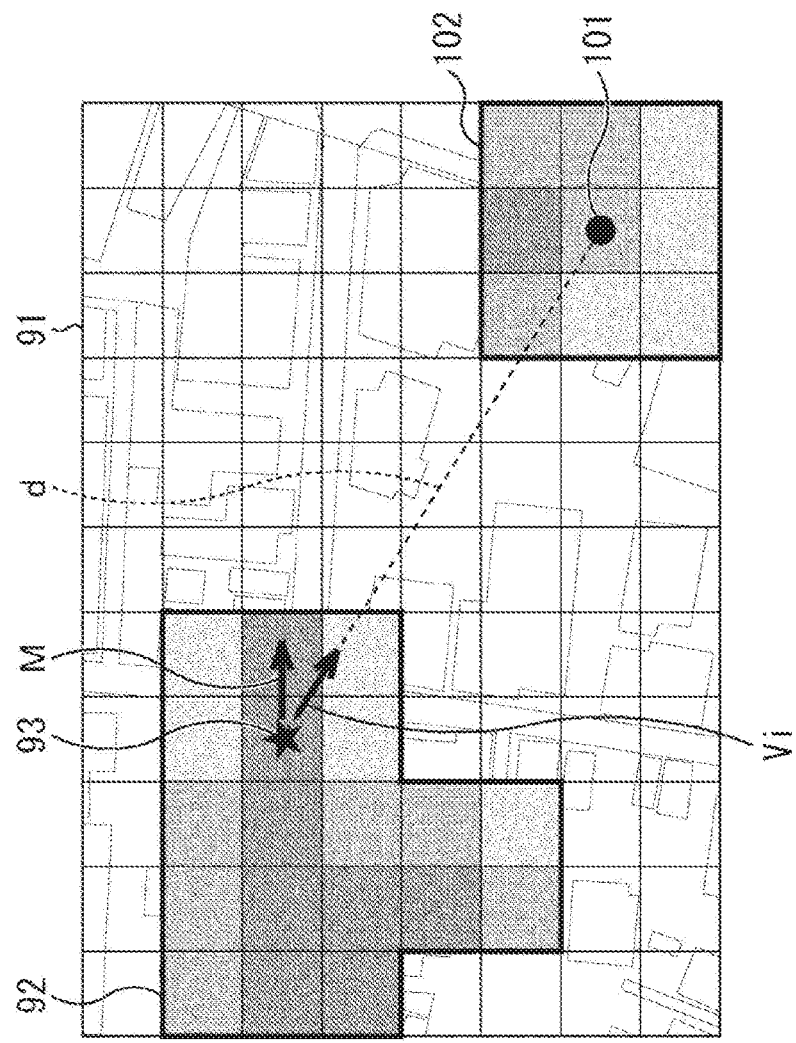
FIG. 11 is a diagram for explaining a measurement process in a case where there are a plurality of mobile units.
FIG. 12 is a table showing an example of human flow data.

In step S73, the control unit 34 determines a direction, for example, as described above with respect to step S52 in FIG. 7. The measurement area 91 shown in FIG. 11 is divided to have a lattice-like form of such a size that can be measured in one operation by a mobile unit 21. Of the lattice, the lattice cell group 92 that has already been measured is shaded as a heat map according to the human flow. For example, the shades of the lattice cells represent the amounts of human flow.

In step S74, the control unit 34 controls the drive unit 36 to move the mobile unit 21 in the direction determined in step S73. Note that, at that time, in a case where the distance d between the present location 93 of the mobile unit 21-1 and the present location 101 of the mobile unit 21-2 is shorter than a predetermined distance D as shown in FIG. 11, the motion vector M is corrected as M' according to the following equation (1) based on the unit directional vector Vi of the mobile unit 21-1 toward the mobile unit 21-2.

[Mathematical Formula 1]

$$M' = M - Vi \times (D-d)/D \text{ (where, } D > d) \tag{1}$$

In this manner, it is possible to prevent the mobile units from getting close to each other.

In step S75, the control unit 34 determines whether or not to end the measurement process. If it is determined in step S75 that the measurement process is not to be ended, the process returns to step S51, and the process thereafter is repeated. If it is determined in step S75 that the measurement process is to be ended, the measurement process is ended.

As described above, in a case where there are a plurality of mobile units, the mobile units are prevented from becoming too close to each other. In this manner, collisions can be avoided, and the same measurement is not repeated. Thus, efficient measurement can be performed.

FIG. 12 is a diagram showing an example of human flow data obtained through human flow measurement.

The human flow data contains information about a number n of people and a measurement time t for each lattice cell of the measurement area 91 divided to have a lattice-like form.

Figure 13:
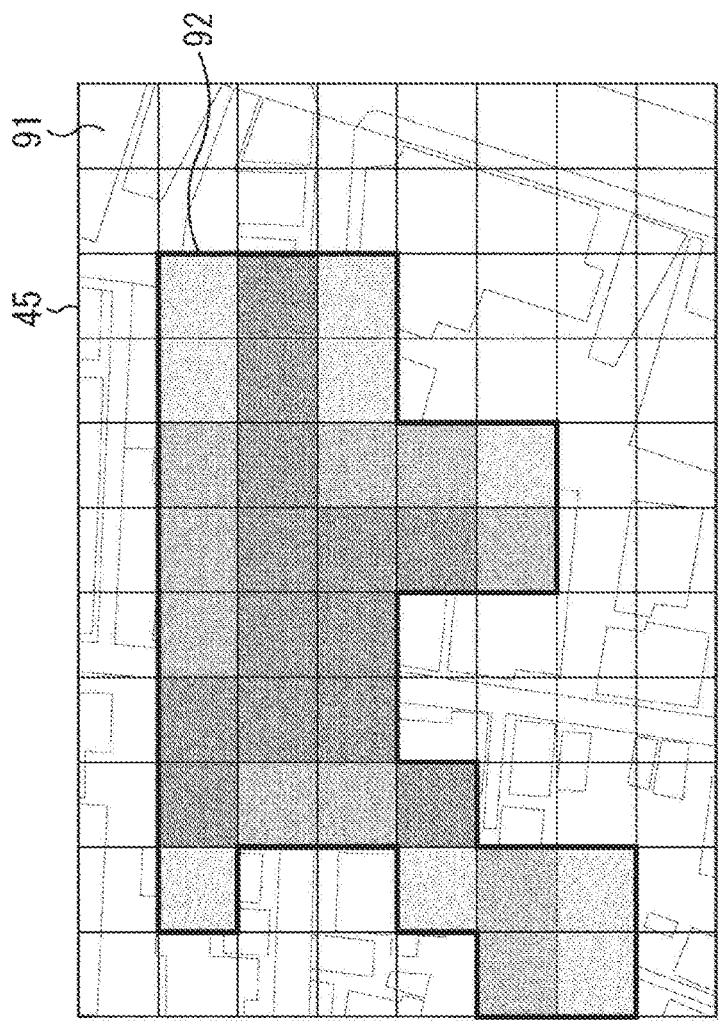
FIG. 13 is a diagram showing an example of display corresponding to human flow data.

FIG. 13 shows an example of human flow display displayed on the display unit 45 in accordance with human flow data on the side of the terminal 22. In the example shown in FIG. 13, a lattice cell group 92 that has already been measured in the lattice is shaded as a heat map according to the human flow. For example, the shades of the lattice cells represent the amounts of human flow.

Figure 14:
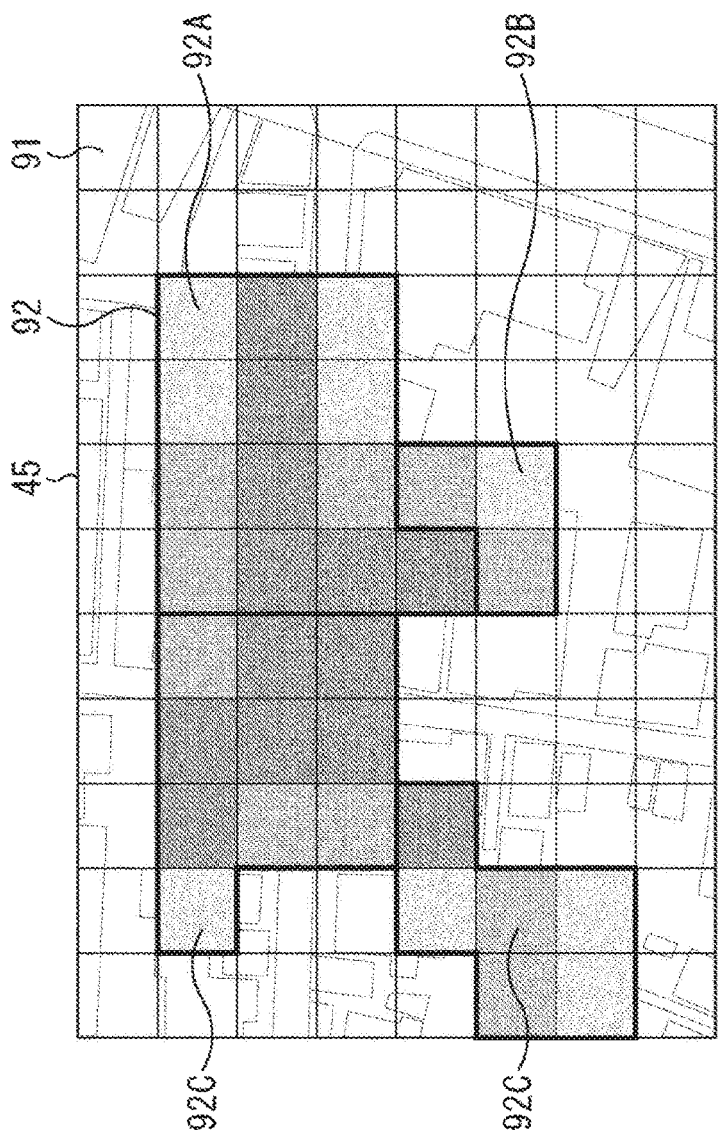
FIG. 14 is a diagram showing another example of display corresponding to human flow data.

FIG. 14 shows another example of human flow display displayed on the display unit 45 in accordance with human flow data on the side of the terminal 22.

In the example shown in FIG. 14, lattice cells are shaded in the same manner as above, for ease of illustration. In the actual lattice cell group 92 that has already been measured, however, the human flow data of a lattice cell group 92B is older than the human flow data of a lattice cell group 92A in terms of time. Therefore, the lattice cell group 92B is displayed with a higher degree of transparency or a lower degree of saturation than the lattice cell group 92A. Further, the human flow data of a lattice cell group 92C is older than the human flow data of the lattice cell group 92B in terms of time. Therefore, the lattice cell group 92C is displayed with a higher degree of transparency or a lower degree of saturation than the lattice cell group 92B.

In the above manner, it is possible to indicate that the data gradually deviates from the current state as time passes since the measurement time till the current time.

Figure 15:
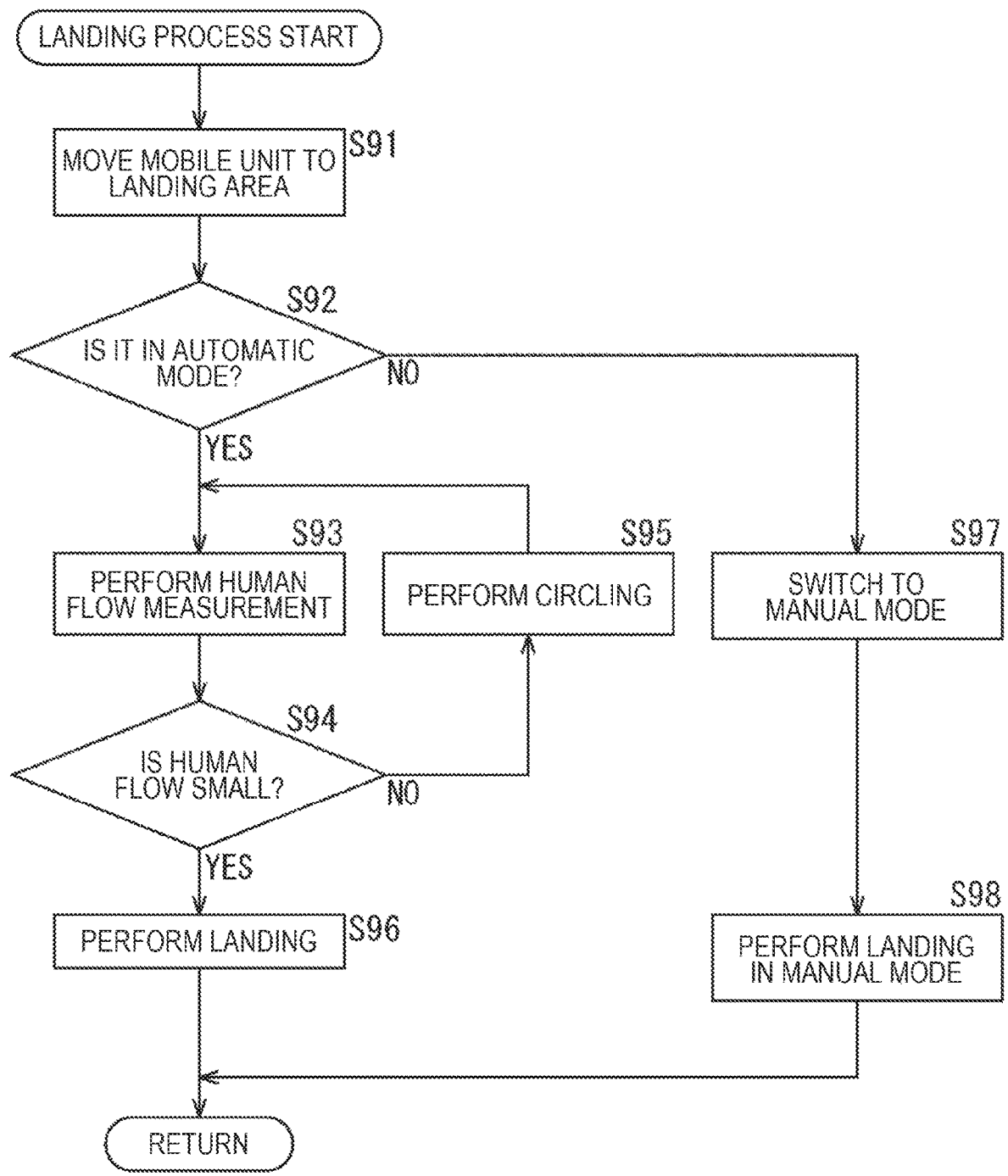
FIG. 15 is a flowchart for explaining a landing process.

Referring now to the flowchart in FIG. 15, the landing process in step S18 in FIG. 3 is described.

In step S91, the control unit 34 controls the drive unit 36 to move the mobile unit 21 to the landing area (charging) set by the terminal 22.

In step S92, the control unit 34 determines whether or not the landing is in an automatic mode. If the landing is determined to be in the automatic mode in step S92, the process moves on to step S93. In step S93, the control unit 34 controls the human flow measurement unit 31 to perform human flow measurement. In step S94, the control unit 34 then checks the human flow measurement result, to determine whether or not the amount of human flow is small.

If the amount of human flow is determined to be large in step S94, the process moves on to step S95. In step S95, the control unit 34 controls the drive unit 36 to cause the mobile unit 21 to circle. After that, the process returns to step S93, and the process thereafter is repeated.

If the amount of human flow is determined to be small in step S94, the process moves on to step S96. In step S96, the control unit 34 controls the drive unit 36 to cause the mobile unit 21 to land.

If the landing is determined not to be in the automatic mode in step S92, on the other hand, the process moves on to step S97. In step S97, the control unit 34 switches to a manual mode. After that, in step S98, the control unit 34 causes the mobile unit 21 to land in the manual mode. That is, the mobile unit 21 is made to land, in accordance with a control signal transmitted and received from the control unit 42 of the terminal 22 via the communication unit 43 and the communication unit 35.

Figure 16:
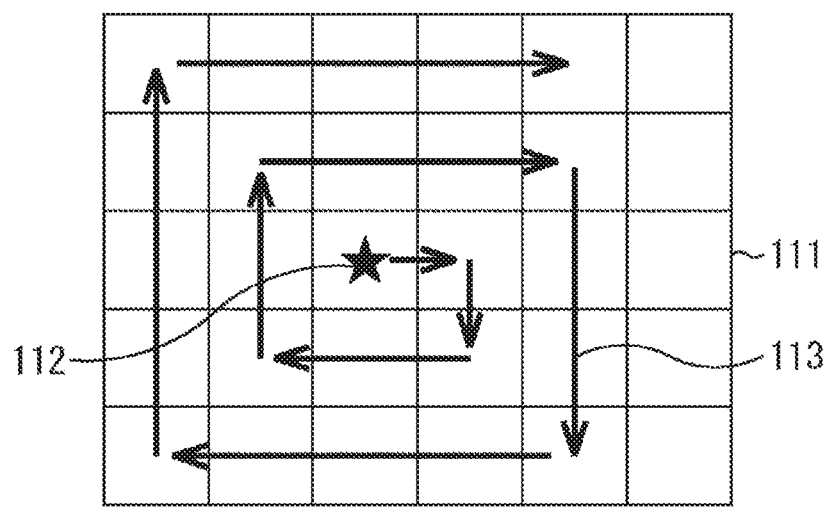
FIG. 16 is a diagram for explaining a landing process in an automatic mode.

As described above, in the landing area 111, the mobile unit 21 in the manual mode is made to land under the control of the terminal 22 of the operator. In the automatic mode, human flow is measured while the mobile unit 21 circles as indicated by arrows 113 from the present location 112, and the mobile unit 21 is made to land at a position where the human flow is small, as shown in FIG. 16.

In this manner, it is possible to prevent the mobile unit from bumping into a person or being stolen.

Note that although examples of human flow measurement have been described so far, it is also possible to measure the flow of mobile telephones that are carried by humans and have a Wi-Fi function, or vehicles equipped with on-board units with a Wi-Fi function. Human flow may be measured in an outdoor measurement area, or human flow may be measured at a station or the like.

As described above, according to the present technology, human flow data in a wide area can be easily obtained.

<Personal Computer>

The above described series of processes can be performed by hardware, or can be performed by software. In a case where the series of processes are to be performed by software, the program that forms the software is installed into a computer. Note that examples of the computer include a computer incorporated into dedicated hardware and a general-purpose personal computer or the like capable of executing various functions by installing various programs therein.

Figure 17:
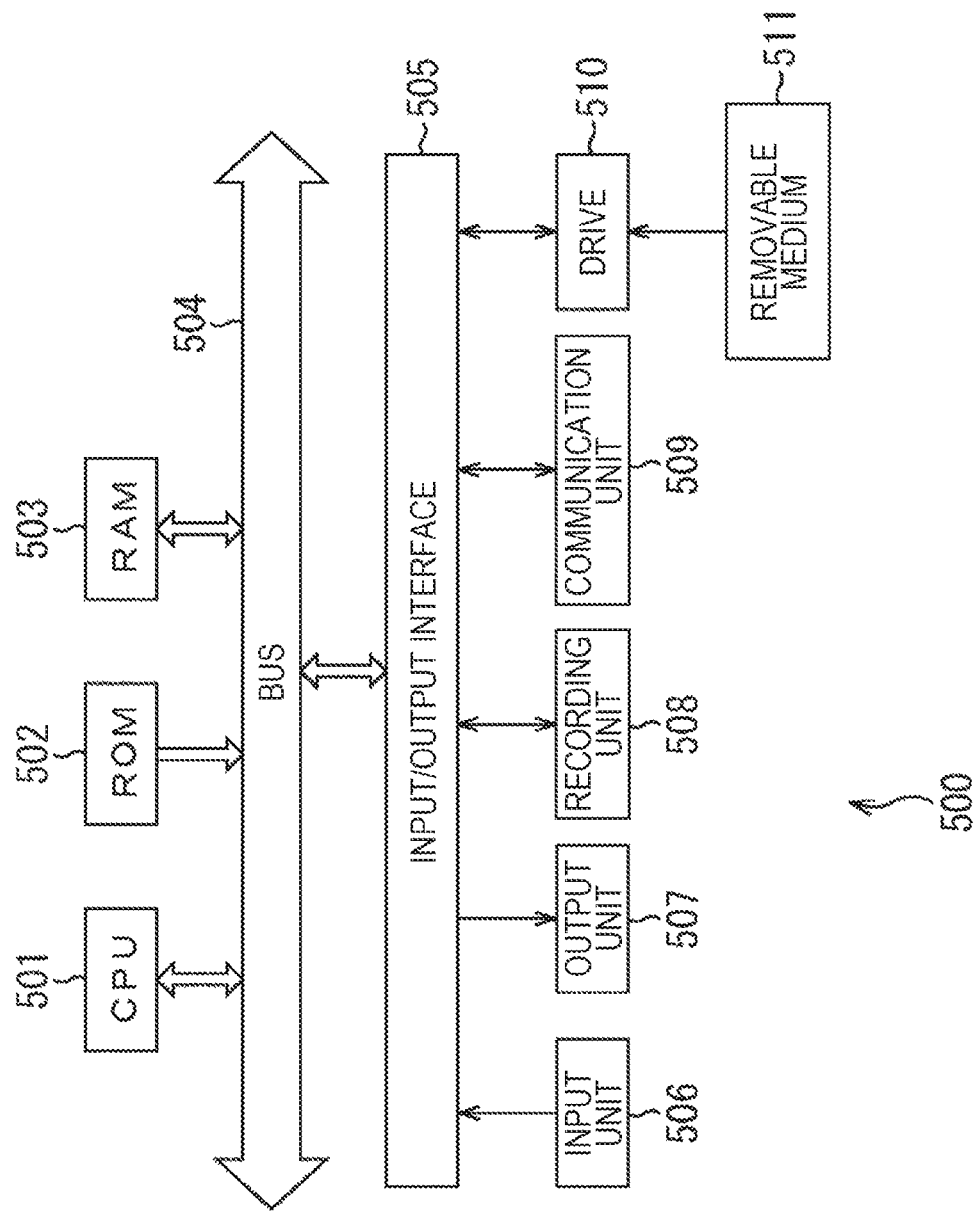
FIG. 17 is a block diagram showing an example configuration of a personal computer to which the present technology is applied.

FIG. 17 is a block diagram showing an example configuration of the hardware of a personal computer that performs the above described series of processes in accordance with a program.

In the personal computer 500, a central processing unit (CPU) 501, a read only memory (ROM) 502, and a random access memory (RAM) 503 are connected to one another by a bus 504.

An input/output interface 505 is further connected to the bus 504. An input unit 506, an output unit 507, a storage unit 508, a communication unit 509, and a drive 510 are connected to the input/output interface 505.

The input unit 506 is formed with a keyboard, a mouse, a microphone, and the like. The output unit 507 is formed with a display, a speaker, and the like. The storage unit 508 is formed with a hard disk, a nonvolatile memory, or the like.

The communication unit 509 is formed with a network interface or the like. The drive 510 drives a removable medium 511 such as a magnetic disk, an optical disk, a magnetooptical disk, or a semiconductor memory.

In the personal computer 500 having the above described configuration, the CPU 501 loads a program stored in the storage unit 508 into the RAM 503 via the input/output interface 505 and the bus 504, for example, and executes the program. As a result, the series of processes described above is performed.

The program to be executed by the computer (the CPU 501) can be recorded on the removable medium 511 and be provided. The removable medium 511 is, for example, a packaged medium or the like that is formed with a magnetic disk (including a flexible disk), an optical disk (such as a Compact Disc-read only memory (CD-ROM) or a digital versatile disc (DVD)), a magnetooptical disk, a semiconductor memory, or the like. Alternatively, the program can be provided via a wired or wireless transmission medium, such as a local area network, the Internet, or digital satellite broadcasting.

In the computer, the program can be installed into the storage unit 508 via the input/output interface 505 when the removable medium 511 is mounted on the drive 510. Alternatively, the program may be received by the communication unit 509 through a wired or wireless transmission medium, and be installed into the storage unit 508. Also, the program may be installed beforehand into the ROM 502 or the storage unit 508.

Note that the program to be executed by the computer may be a program for performing processes in chronological order in accordance with the sequence described in this specification, or may be a program for performing processes in parallel or performing a process when necessary, such as when there is a call.

Also, in this specification, steps describing a program recorded on a recording medium include processes to be performed in parallel or independently of one another if not necessarily in chronological order, as well as processes to be performed in chronological order in accordance with the sequence described herein.

In addition, in this specification, a system refers to the entirety of equipment including more than one device.

Note that embodiments of the present disclosure are not limited to the above described embodiments, and various modifications may be made to them without departing from the scope of the present disclosure.

For example, the present disclosure can be embodied in a cloud computing configuration in which one function is shared among a plurality of devices via a network, and processing is performed by the devices cooperating with one another.

Furthermore, any configuration described above as one device (or processing unit) may be divided into a plurality of devices (or processing units). Conversely, any configuration described above as a plurality of devices (or processing units) may be combined into one device (or processing unit). Furthermore, it is of course possible to add components other than those described above to the configuration of any of the devices (or processing units). Further, some components of a device (or processing unit) may be incorporated into the configuration of another device (or processing unit) as long as the configuration and the functions of the entire system remain substantially the same. That is, the present technology is not limited to the embodiments described above, but various modifications may be made to them without departing from the scope of the present technology.

While preferred embodiments of the present disclosure have been described above with reference to the accompanying drawings, the present disclosure is not limited to those examples. It is apparent that those who have ordinary skills in the art can make various changes or modifications within the scope of the technical spirit claimed herein, and it should be understood that those changes or modifications are within the technical scope of the present disclosure.

Note that the present technology may also be embodied in the configurations described below.

(1) An information processing device including:
a setting unit that sets a measurement area;
a mobile unit control unit that controls a mobile unit to move to the measurement area set by the setting unit and measure human flow data indicating human flow;
a reception unit that receives the human flow data measured by the mobile unit; and
a display control unit that controls display corresponding to the human flow data received by the reception unit.

(2) The information processing device according to (1), in which, when the mobile unit is not in the measurement area, the mobile unit control unit controls the mobile unit to move from a present location to the measurement area and measure the human flow data.

(3) The information processing device according to (1) or (2), in which the mobile unit control unit controls the mobile unit to measure the human flow data in the vicinity while circling from a present location in the measurement area.

(4) The information processing device according to any of (1) to (3), in which the mobile unit control unit controls the mobile unit to turn toward the position with the largest human flow and measure the human flow data in the vicinity in the measurement area.

(5) The information processing device according to any of (1) to (4), in which, when a plurality of mobile units perform measurement, the mobile unit control unit controls each of the plurality of mobile units to measure the human flow data in the vicinity by moving while correcting a motion vector.

(6) The information processing device according to any of (1) to (5), in which the display control unit controls display in which a size of human flow corresponding to the human flow data is expressed in a heat map.

(7) The information processing device according to (6), in which, when controlling the display in which the size of human flow corresponding to the human flow data is expressed in a heat map, the display control unit controls the display, to make previous data portions vary with time.

(8) The information processing device according to any of (1) to (7), in which the setting unit sets a landing area.

(9) The information processing device according to (8), in which the mobile unit control unit controls the mobile unit to move to the landing area set by the setting unit at an end of measurement or at a time of a fuel shortage.

(10) The information processing device according to (9), in which
the setting unit further sets the number of people existing in the vicinity at a time of landing, the mobile unit control unit controls the mobile unit to measure the human flow data in the landing area, when the measured human flow data is larger than the number of people set by the setting unit, the mobile unit control unit controls the mobile unit to measure the human flow data while circling, and when the measured human flow data is smaller than the number of people set by the setting unit, the mobile unit control unit controls the mobile unit to land.

(11) The information processing device according to (9), further including a transmission unit that transmits landing instruction data,
in which, when receiving the landing instruction data transmitted by the transmission unit, the mobile unit control unit controls the mobile unit to land in the landing area in accordance with the landing instruction data.

(12) An information processing method implemented by an information processing device,
the information processing method including:
setting a measurement area;
controlling a mobile unit to move to the measurement area set by the setting unit and measure human flow data indicating human flow;
receiving the human flow data measured by the mobile unit; and
controlling display corresponding to the received human flow data.

(13) A recording medium storing a program for causing a computer to function as:
a setting unit that sets a measurement area;
a mobile unit control unit that controls a mobile unit to move to the measurement area set by the setting unit and measure human flow data indicating human flow;
a reception unit that receives the human flow data measured by the mobile unit; and
a display control unit that controls display corresponding to the human flow data received by the reception unit.

REFERENCE SIGNS LIST

11 Human flow measurement system
21, 21-1, 21-2 Mobile unit
22 Terminal
31 Human flow measurement unit
32 Position measurement unit
33 Human flow data DB
34 Control unit
35 Communication unit
36 Drive unit
41 Human flow data DB
42 Control unit
43 Communication unit
44 Input unit
45 Display unit
51 Mobile unit control unit
52 Display control unit
53 Registration unit
91 Measurement area
92, and 92A to 92 Lattice cell group
93 Present location
94 Arrow
101 Present location
102 Lattice cell group
111 Landing area
112 Present location
113 Arrow

The invention claimed is:

1. A method for controlling an information processing device comprising:
setting a measurement area based on at least a latitude and a longitude;
controlling a mobile unit to move to the measurement area and measure human flow data indicating human flow;
receiving the human flow data measured by the mobile unit;
displaying the human flow data on a display of the information processing device;
setting a landing area;

controlling the mobile unit to move to the landing area at an end of measurement or at a time of a fuel shortage;
setting a number of people existing in the landing area at a time of landing;
controlling the mobile unit to measure the human flow data in the landing area,
when the measured human flow data is larger than the set number of people, controlling the mobile unit to measure the human flow data while circling, and
when the measured human flow data is smaller than the set number of people, controlling the mobile unit to land.

2. The method according to claim 1, further comprising:
when the mobile unit is not in the measurement area, controlling the mobile unit to move from a present location to the measurement area and measure the human flow data.

3. The method according to claim 1, further comprising:
controlling the mobile unit to measure the human flow data in the vicinity while circling from a present location in the measurement area.

4. The method according to claim 1, further comprising:
controlling the mobile unit to turn toward the position with the largest human flow and measure the human flow data in the vicinity in the measurement area.

5. The method according to claim 1, further comprising:
when a plurality of mobile units perform measurement, controlling each of the plurality of mobile units to measure the human flow data in the vicinity by moving while correcting a motion vector.

6. The method according to claim 1, further comprising:
controlling the display in which a size of human flow corresponding to the human flow data is expressed in a heat map.

7. The method according to claim 6, further comprising:
when controlling the display in which the size of human flow corresponding to the human flow data is expressed in a heat map, controlling the display to make previous data portions vary with time.

8. The method according to claim 1, further comprising:
transmitting landing instruction data,
when receiving the landing instruction data transmitted by the transmission unit, controlling the mobile unit to land in the landing area in accordance with the landing instruction data.

9. The method according to claim 1, wherein the measurement area is set using at least two measurement points, each of the measurement points has an associated latitude and an associated longitude.

10. An information processing device comprising circuitry configured to:
set a measurement area based on at least a latitude and a longitude;
control a mobile unit to move to the measurement area and measure human flow data indicating human flow;
receive the human flow data measured by the mobile unit; and
display the human flow data on a display of the information processing device,
wherein the human measurement flow is measured using Wi-Fi signals received from a plurality of mobile devices.

11. An information processing method comprising:
setting a landing area of a mobile unit;
setting a number of people existing in the landing area at a time of landing;
controlling the mobile unit to measure human flow data in the landing area,
controlling the mobile unit to move to the landing area at an end of measurement or at a time of a fuel shortage,
when the measured human flow data is larger than the set number of people, controlling the mobile unit to measure the human flow data while circling, and
when the measured human flow data is smaller than the set number of people, controlling the mobile unit to land.

12. An information processing method implemented by an information processing device, the information processing method comprising:
setting a measurement area based on at least a latitude and a longitude;
controlling a mobile unit to move to the measurement area set by the setting unit and measure human flow data indicating human flow;
receiving the human flow data measured by the mobile unit;
controlling display of the received human flow data on a display of the information processing device,
setting a landing area;
controlling the mobile unit to move to the landing area at an end of measurement or at a time of a fuel shortage;
setting a number of people existing in the landing area at a time of landing;
controlling the mobile unit to measure the human flow data in the landing area,
when the measured human flow data is larger than the set number of people, control the mobile unit to measure the human flow data while circling, and
when the measured human flow data is smaller than the set number of people, control the mobile unit to land.

13. A non-transitory recording medium storing a program for causing a computer to:
set a measurement area based on at least a latitude and a longitude;
control a mobile unit to move to the measurement area set by the setting unit and measure human flow data indicating human flow;
receive the human flow data measured by the mobile unit; and
display the human flow data received by the reception unit on a display,
set a landing area;
control the mobile unit to move to the landing area at an end of measurement or at a time of a fuel shortage;
set a number of people existing in the landing area at a time of landing;
control the mobile unit to measure the human flow data in the landing area,
when the measured human flow data is larger than the set number of people, control the mobile unit to measure the human flow data while circling, and
when the measured human flow data is smaller than the set number of people, control the mobile unit to land.

* * * * *